United States Patent [19]

Wilke

[11] Patent Number: 4,693,272
[45] Date of Patent: Sep. 15, 1987

[54] POST PRESSURE COMPENSATED UNITARY HYDRAULIC VALVE

[75] Inventor: Raud A. Wilke, Brookfield, Wis.

[73] Assignee: Husco International, Inc., Waukesha, Wis.

[21] Appl. No.: 904,798

[22] Filed: Sep. 5, 1986

Related U.S. Application Data

[63] Continuation of Ser. No. 579,394, Feb. 13, 1984, abandoned.

[51] Int. Cl.⁴ ............................................. F15B 13/08
[52] U.S. Cl. ..................................... 137/596; 60/427; 60/452; 91/446; 91/518; 91/531
[58] Field of Search ................... 60/427, 452; 91/446, 91/512, 518, 531; 137/596, 596.13, 625.68

[56] References Cited

U.S. PATENT DOCUMENTS

| Re. 29,329 | 8/1977 | Walters | 137/596 X |
|---|---|---|---|
| 3,465,519 | 9/1969 | McAlvay et al. | 91/446 X |
| 3,532,119 | 10/1970 | Lind | 137/596 |
| 3,534,774 | 10/1970 | Tennis | 137/625.68 X |
| 3,693,506 | 9/1972 | McMillen et al. | 91/531 X |
| 3,768,372 | 10/1973 | McMillen | 91/531 X |
| 3,777,773 | 12/1973 | Tolbert | 137/596.13 X |
| 3,881,512 | 5/1975 | Wilke . | |
| 4,037,410 | 7/1977 | Jackson et al. | 60/452 X |
| 4,051,868 | 10/1977 | Andersen | 137/596.13 |
| 4,058,135 | 11/1977 | Petro | 91/447 X |
| 4,117,862 | 10/1978 | Qureshi . | |
| 4,139,021 | 2/1979 | Ailshie et al. . | |
| 4,253,482 | 3/1981 | Stephens . | |
| 4,352,375 | 10/1982 | Williams | 137/596.13 X |
| 4,355,655 | 10/1982 | Hertell et al. . | |
| 4,361,169 | 11/1982 | Williams . | |
| 4,436,114 | 3/1984 | Kotter | 60/427 X |
| 4,519,419 | 5/1985 | Petro | 91/446 X |
| 4,519,420 | 5/1985 | Petro | 91/446 X |

Primary Examiner—Gerald A. Michalsky
Attorney, Agent, or Firm—Andrus, Sceales, Starke & Sawall

[57] ABSTRACT

A pressure compensated hydraulic valve (2) is provided with a housing (4) having a reciprocal spool (6) for communicating hydraulic fluid to work ports (8,10). Pressure compensating means (58) is provided in the same housing with the valve and senses work port pressure by hydraulic fluid flow through the spool from the work port and creates a substantially fixed differential pressure across the spool by controlling the pressure after the flow has passed through the spool.

6 Claims, 2 Drawing Figures

POST PRESSURE COMPENSATED UNITARY HYDRAULIC VALVE

This is a continuation of application Ser. No. 06/579,394 filed Feb. 13, 1984, now abandoned.

BACKGROUND AND SUMMARY

The invention relates to pressure compensated hydraulic valves, wherein a fixed differential pressure is maintained, to maintain a uniform flow rate.

In a hydraulic valve having a reciprocal spool for communicating hydraulic fluid to work ports, it is known to create a fixed differential pressure across the spool by controlling the pressure before the flow has passed through the spool. For example in Wilke U.S. Pat. No. 3,881,512, the hydraulic fluid is preconditioned before it flows across control spool 13 by an initial pressure compensating valve mechanism 15 which divides flow from inlet 18 to either feeder 20 or bypass 19 to keep the flow through work port 22 constant for any given position of spool 13 regardless of fluxuations in pump or load pressure.

In the present invention, a fixed differential pressure is created by controlling pressure after hydraulic flow has passed through the spool.

The present invention evolved from cost reduction efforts to minimize the number and complexity of parts, particularly those requiring machining. This is accomplished in part by marrying certain open flow circuit structure with pressure compensated circuit structure. In an open flow circuit, the flow rate changes in response to load pressure. Unitary open flow hydraulic valves are known having check valves in the same housing as the control spool, typically in the area of a bridge passage between work ports through the spool.

The present invention provides a unitary pressure compensated hydraulic valve, eliminating a separate discreet pressure compensating module. The pressure compensating means of the invention is in the same housing as the control spool. Furthermore, the invention enables known check valve structure and location from open flow circuitry to be applied and used in pressure compensating and shuttle circuits. This facilitates economy of manufacture by enabling use of existing manufacturing steps and assembly line sequences for as much of the valve as possible. The use of check valve structure for pressure compensating and shuttle circuits is further desirable because it typically involves a less expensive stamping operation, as opposed to machining or the like.

DETAILED DESCRIPTION

Figure 1:
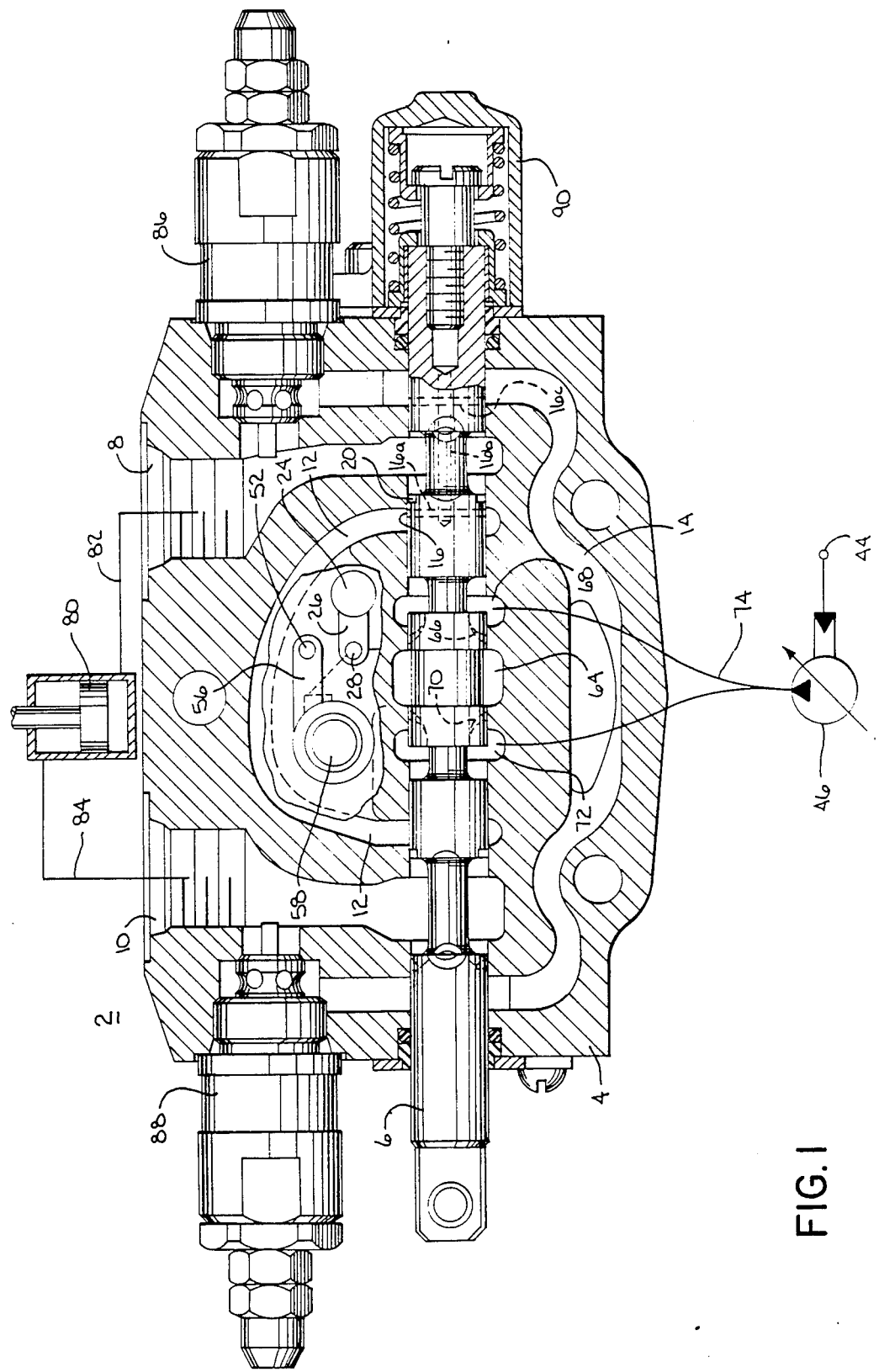
FIG. 1 is a sectional side view of a valve constructed in accordance with the invention.

Referring to FIG. 1, valve 2 includes a housing 4 having a reciprocal control spool 6 moveable left-right for communicating hydraulic fluid to work ports 8 and 10. Spool 6 is shown in the neutral position, and bridge passage 12 is vented to reservoir passage or tank 14 through bridge vent passage 16 in the control spool as shown at dashed line vent passages 16a, 16b and 16c.

When spool 6 is moved leftwardly by the operator, bridge vent passage 16 is blocked, and bridge passage 12 is placed in communication with work port 8 through control spool passage 20, such that the work port pressure is sensed in bridge passage 12 by hydraulic fluid flow through the spool bore. This applied work port pressure pressurizes a pilot system for load sensing and pressure compensation.

Figure 2:
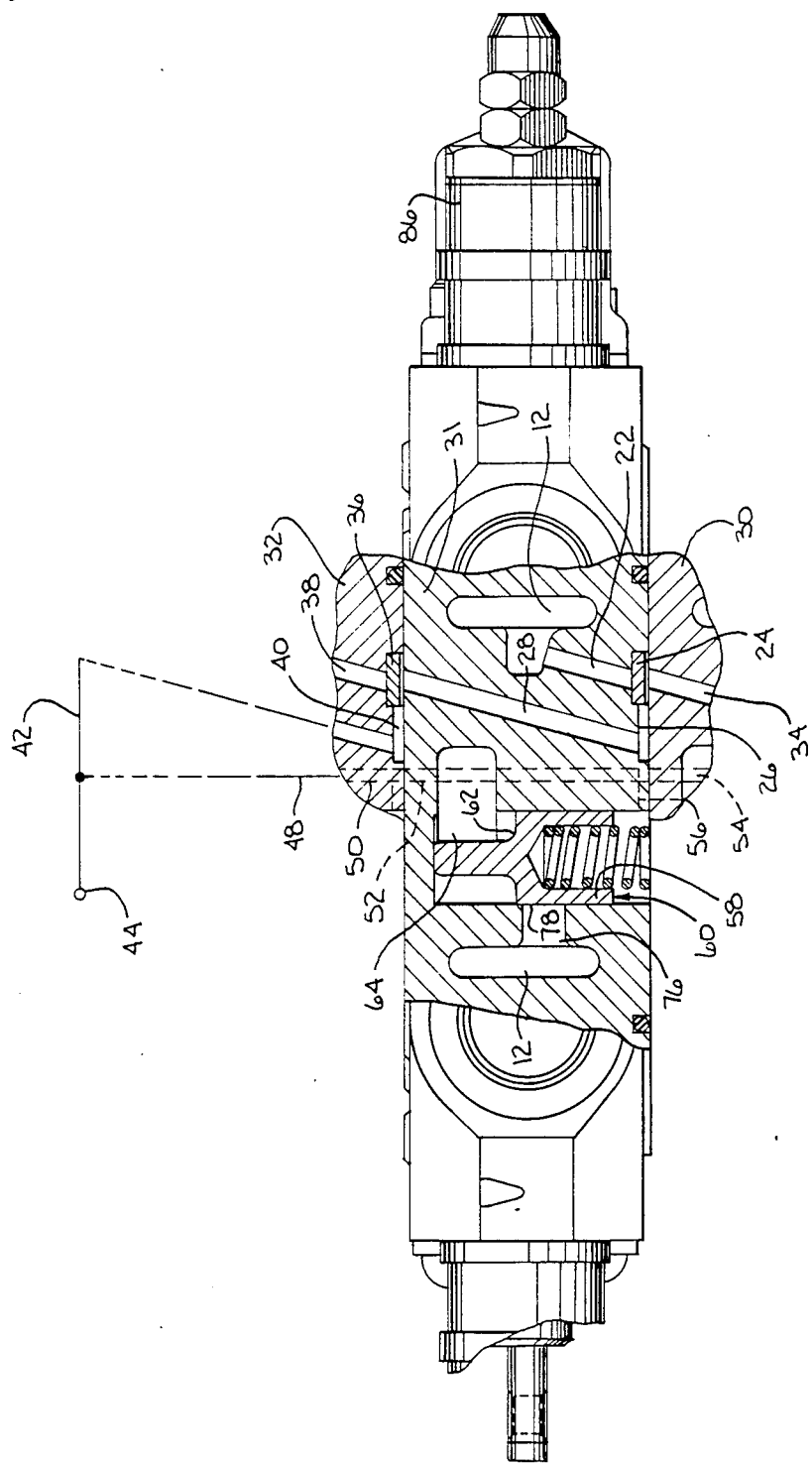
FIG. 2 is a sectional top view of the valve of FIG. 1.

Bridge passage 12 is in communication with a sensing shuttle passage 22, FIG. 2. If the valve is a single section or monoblock valve, the hydraulic flow in passage 22 continues past shuttle check valve 24 and into crossing passage 26 and through-shuttle passage 28. If the valve is a multi-section valve, then a plurality of identical valve sections are aligned side by side, for example as shown cut away at 30 and 32. If the work port pressure of central section 31 in sensing shuttle passage 22 is greater than the work port pressure in through-shuttle passage 34 of the previous section 30, then shuttle check valve 24 moves downwardly to close passage 34 and the higher pressure from passage 22 is communicated through crossing passage 26 to through shuttle passage 28. If the work port pressure in sensing shuttle passage 22 of present valve section 31 is less than the work port pressure in the through-shuttle passage 34 of the previous section 30, then shuttle check valve 24 moves upwardly to close passge 22 and enable the higher pressure in passage 34 to be communicated to through-shuttle passage 28. Likewise, shuttle check valve 36 of the next section 32 operates to apply the higher pressure of through-shuttle passage 28 of the present section 31 and sensing shuttle passage 38 of the next section 32 to the through-shuttle passage 40 of next section 32. In this manner, the highest work port pressure of all the valve sections is communicated to a sense line 52 connected to the input 44 of hydraulic pump 46 and to a communication passage 48 which extends through all of the valve sections, as shown through respective passages 50, 52 and 54.

Transfer passage 52 communicates through cross passage 56 with a pressure compensating check valve 58, such as a spring biased poppet. The bottom side 60 of check valve 58 is thus applied with the pressure from passage 52, which is the highest work port pressure of the valve sections. The top side 62 of valve 58 is of the same area as the bottom side and thus the same pressure is applied in passage 64 above valve 58. Passage 64 around the top of valve 58 is a feeder passage which also has a section around spool 6, FIG. 1. The pressure in feeder passage 64 is thus the highest work port pressure of the multiple valve sections.

The above noted description explains pressurization of the system in response to initial movement of spool 6. This pressurization occurs before metering notch or passage 66 in the spool comes into communication with feeder passsage 64.

Further leftward movement of spool 6 brings metering passage 66 into communication with feeder passage 64. Supply passage 68 then communicates with feeder passage 64 through metering passage 66. Metering passage 70 and supply passage 72, effective during rightward movement of spool 6, are comparable. Supply passages 68 and 72 are suppled from pump 46 which outputs hydraulic flow pressure on output 74 which is a predetermined amount greater than the flow pressure input to the pump at 44. Since the pressure at 44, FIGS. 1 and 2, is the highest work port pressure of the valve sections, the pressure in supply passages 68 and 72 is the noted predetermined amount greater than the highest work port pressure. As above noted, the initial pressurization of the system causes the pressure in feeder passage 64 to be the same as the highest work port pressure. There is thus a fixed differential pressure across metering passage 66 from supply passage 68 to feeder passage 64.

Hydraulic fluid can flow from supply passage 68 through metering passage 66 to feeder passage 64. Feeder passage 64, FIG. 2, communicates with the left side of bridge passage 12 through cross passage 76 and an orifice 78 opened by downward movement of pressure compensating check valve 58. The flow rate in feeder passage 64 is such as to provide sufficient fluid to afford the same amount of pressure on the top side 62 as on the bottom side 60 of valve 58. Valve 58 can move up and down to control the size of orifice 78, such that should the load increase, causing work port pressure to increase, the shuttle system responds to impose the increased load pressure on the bottom of the check valves 58 in all of the valve sections so that the poppets 58 can operate as load holding check valves. This increased pressure is also sensed at port 44 of the pump to effect an increase in the output pressure of the pump and thereby increase the pressure in the inlet passage 68 (or 72) sufficiently to maintain the pressure differential across the metering notches 66. In as much as this same increased load pressure is manifested at the bottoms of the poppets 58 in the stack of valve sections, the desired pressure differential will be maintained across the metering notches in any of the spools in adjacent sections that have been actuated to operating positions.

Load 80 is raised via outlet and inlet work ports 8 and 10 and their respective connection lines 82 and 84. Further leftward movement of spool 6 by the operator further raises load 80 by increasing the area of metering passage 66 which is exposed to feeder passage 64. Flow rate is equal to the product of the area and the square root of the differential pressure. Since the differential pressure across metering passage 66 is constant, flow rate is a direct linear function of the area of metering passage 66 which is in communication with feeder passage 64. This area is increased during further leftward movement of spool 6, thus supplying more fluid and raising load 80. Standard pressure relief valves 86 and 88 are provided for the work ports and reservoir passage. A standard spring centering mechanism 90 is provided on the end of spool 6 for locating the latter's neutral position.

From the foregoing description it will be appreciated that one of the outstanding features of the invention resides in the fact that the valve mechanism can act as a flow divider due to the maintenance of the same pressure differential across the metering notches of all the spools that have been shifted to operating positions. This is achieved regardless of pump output, even if the demands of the various systems exceed pump output capacity.

It is recognized that various modifications are possible within the scope of the appended claims.

I claim:

1. A closed center hydraulic control valve assembly comprised of a plurality of control valve sections joined in a bank and for use with a variable displacement pump having output and pressure sensing ports, each of said control valve sections having therein a valve spool movable to an operating position for selectively directing pressure fluid from a supply passage to one of a pair of workports via a feeder passage having upstream and downstream branches with a connecting passage therebetween and with said downstream feeder branch having a U-shaped bridge passage having a pair of legs selectively respectively communicable with said workports by said valve spool, the improvement which comprises:

a check valve biased in one direction toward a position closing said connecting passage and adapted to be moved in the oposite direction to a position opening said connecting passage under force exerted on said check valve in said upstream feeder branch;

metering means on said spool for establishing a predetermined pressure differential across said spool in said operating position;

means for translating workport pressure into force on said check valve and also tending to move said check valve in said closing one direction whereby said check valve can act to hold a load in the absence of pressure in said upstream feeder branch;

means in said housing to communicate workport pressure with said sensing input port of said variable displacment pump having said output port connected with said supply passage, whereby said check valve acts as a pressure compensating valve and moves back and forth to vary the degree of communication between said feeder branches in response to variations in the forces of opposing fluid pressures acting thereon, to thereby maintain said predetermined pressure differential across said spool and shuttle means operable to effect subjection of each said check valve to the highest pressure of any said workport in said bank, said shuttle means comprising a sensing shuttle passage in each said control section between the respective said bridge passage and a shuttle check valve, and a through shuttle passage between said shuttle check valve of its control section and the shuttle check valve of the next control section, such that if the workport pressure in said bridge passage is greater than the workport pressure in the bridge passage in the previous section, then said shuttle check valve in the present section closes the through shuttle passage of the previous section and opens the sensing shuttle passage of the present section to the through shuttle passage of the present section such that the workport pressure in the bridge passage of the present section is passed through the sensing shuttle passage of the present section to the next section, and such that if the workport pressure in the bridge passage of the present section is less than the workport pressure in the bridge passage of the previous section, then the shuttle check valve of the present section closes the sensing shuttle passage of the present section such that the workport pressure of the previous section flows through the shuttle passage of the previous section and into the through shuttle passage of the present section and into the next section, such that the highest workport pressure is communicated to said pump and to the other side of each of said pressure compensating check valves in said sections.

2. The invention according to claim 1 wherein said valve spool is axially reciprocal in said housing, and wherein said through shuttle passage includes a first portion extending axially in said housing from said housing from said shuttle check valve and a second portion extending diagonally transversely across said housing to said shuttle check valves of the next section, said shuttle check valves of the present and next sections being substantially aligned along a lateral direction substantially orthogonal to said axis of axial reciprocation of said valve spool, said first portions of said through shuttle passages of the present and next sections also being substantially aligned along said lateral direction.

3. The invention according to claim 2 wherein said second portion of said through shuttle passage has first and second ends, the first end of said second portion of said through shuttle passage of the present section being axially offset from the second end of said second portion of said through shuttle passage of tne next section and laterally aligned with an end of said sensing shuttle passage of the next section at said shuttle check valve of said next section, the second end of said second portion of said through shuttle passage of the present section being axially offset from an end of said sensing shuttle passage of the present section, and being axially offset from the first end of said second portion of said through shuttle passage of the preceding section said end of said sensing shuttle passage of the present section being laterally aligned with said first end of said second portion of said through shuttle passage of the preceding section at said shuttle check valve of the present section.

4. The invention according to claim 3 wherein said sensing shuttle passage of each said section extends diagonally transversely in said housing parallel to said second portion of said through shuttle passage in its respective said section.

5. A hydraulic control valve for use with a variable displacement pump having output and pressure sensing ports, comprising a housing having therein a valve spool movable in a bore to an operating position at which it directs pump output fluid from a pressure fluid supply passage in the bore to a workport characterized by:

A. means in the housing providing a feeder passage having an inlet branch which has its origin in the bore to receive supply pressure fluid from the supply passage whenever the valve spool is in said operating position thereof, said feeder passage having an outlet branch adjacent to the workport to be communicated therewith through the bore by the valve spool in its said operating position;

B. means in the housing defining a check valve chamber, one end portion of which is situated between said branches of the feeder passage and to which the inlet branch thereof opens to receive supply pressure fluid therefrom;

C. means in the housing providing a connecting passage to communicate said one end portion of the check valve chamber with the outlet branch of the feeder passage and by which said feeder passage branches are communicable with one another;

D. a load holding check valve in said chamber biased in a closing direction toward a position in said one end portion of its chamber at which it blocks fluid flow to said outlet branch of the feeder passage, said check valve being movable in the opening direction under force exerted thereon by pressure of supply fluid in the inlet branch of the feeder passage to provide for flow of such supply fluid to the outlet branch of the feeder passage;

E. means in the housing for translating workport pressure into force on said check valve in opposition to said valve opening force and capable of moving it is said closing direction whereby said check valve can act to hold a load in the event of pressure drop in the inlet branch of the feeder passage; and F. means in the housing to communicate workport pressure with said sensing port of a variable displacement pump having its output port connected with said supply passage, whereby said check valve can act as a pressure compensating valve to move back and forth and thus vary the degree of communication between the feeder passage branches in response to variations in the opposing fluid pressure forces acting thereon, to thereby maintain a predeterminable difference in pressure between fluid in the supply passage and that in the inlet branch of the feeder passage.

6. The hydraulic control valve of claim 5, wherein:

said housing is provided with two workports;

the outlet branch of the feeder passage comprises a U-shaped bridge passage which spans that portion of the bore at which the supply passage and the origin of the feeder passage are located, said bridge passage having a pair of legs selectively respectively communicable with said workports by the valve spool;

one of said legs being in communication with said connecting passage; and the check valve chamber and check valve therein being substantially embraced by the U-shaped bridge passage.

* * * * *